United States Patent [19]

Niimi

[11] Patent Number: 5,155,698
[45] Date of Patent: Oct. 13, 1992

[54] BARREL SHIFTER CIRCUIT HAVING ROTATION FUNCTION

[75] Inventor: Hiroko Niimi, Kanagawa, Japan
[73] Assignee: NEC Corporation, Tokyo, Japan
[21] Appl. No.: 751,308
[22] Filed: Aug. 28, 1991
[30] Foreign Application Priority Data Aug. 29, 1990 [JP] Japan .................. 2-227713

[51] Int. Cl.[5] .............................................. G06F 7/00
[52] U.S. Cl. ............................................... 364/715.08
[58] Field of Search ................................... 364/715.08

[56] References Cited

U.S. PATENT DOCUMENTS

| | | |
|---|---|---|
| 3,618,033 | 11/1971 | Nordquist . |
| 3,961,750 | 6/1976 | Dao .............................. 364/715.08 X |
| 4,338,675 | 7/1982 | Palmer et al. ........................ 364/748 |
| 4,396,994 | 8/1983 | Kang et al. .................. 364/715.08 X |
| 4,437,166 | 3/1984 | O'Brien ....................... 364/715.08 X |
| 4,509,144 | 4/1985 | Palmer et al. ............. 364/715.08 X |
| 4,583,197 | 4/1986 | Chappell et al. .......... 364/715.08 X |
| 4,636,976 | 1/1987 | Takla ............................. 364/715.08 |
| 4,665,538 | 5/1987 | Machida ...................... 364/715.08 |
| 4,829,460 | 5/1989 | Ito ................................. 364/715.08 |
| 4,831,571 | 5/1989 | Tokumaru ................... 364/715.08 |
| 4,839,839 | 6/1989 | Tokumaru et al. ............ 364/715.08 |
| 4,931,971 | 6/1990 | Cook et al. .................. 364/715.08 |
| 5,099,445 | 3/1992 | Studor et al. ................ 364/715.08 |

FOREIGN PATENT DOCUMENTS 59-161731  9/1984  Japan .

OTHER PUBLICATIONS

IEEE Transactions on Computers, vol. C-19, No. 9, 1970, W. Nordquist et al., "A Novel Rotate and Shift Circuit Using Bidirectional Gates", pp. 806, 808.

Primary Examiner—Tan V. Mai
Attorney, Agent, or Firm—Helfgott & Karas

[57] ABSTRACT

In the n-bit barrel shifter circuit having a rotation function, the inputs of a bidirectional barrel shifter are connected with a rightward shift change device and a leftward shift change device for controlling rightward and leftward shifting in accordance with the number of bits to be shifted up to $(n-1)$, respectively, and a bit shift control signal capable of controlling shifting of bits of {(an integer part of $n/2$)+1} bits is inputted to the bidirectional barrel shifter. Therefore, the number of elements required in the barrel shifter circuit can be greatly reduced so that the area occupied by them is reduced. Additionally, the load capacitance attendant to each of the output lines of the barrel shifter can be greatly reduced.

2 Claims, 7 Drawing Sheets

BARREL SHIFTER CIRCUIT HAVING ROTATION FUNCTION

BACKGROUND OF THE INVENTION

The present invention relates to a barrel shifter circuit and, more particulaly, to a barrel shifter circuit having a rotation function designed in an integrated circuit device (IC).

A previously known barrel shifter circuit having a rotating function has the arrangement as shown in FIG. 1. In FIG. 1, a data bus 101 is connected with a unidirectional n-bit barrel shifter 102 the output from which is sent to the data bus 101 through a data latch output buffer circuit 103. An n-bit shift control signal group 104 is also inputted to the above n-bit barrel shifter 102. A data latch control signal 105 and an output control signal 106 are supplied to the data latch control circuit 103.

Now, referring to FIG. 2, an explanation will be given of the operation of the above conventional barrel shifter circuit having a rotating function. Now, it is assumed that rotation of 5 (five) bits is intended. First, the data on the n-bit data bus 101 are inputted to the unidirectional barrel shifter 102. If a 5-bit shifting signal is selected in the n-bit shift control signal group 104, leftward rotation of 5 bits will be carried out, and the output lines corresponding to the respective rotated bits will be connected with the data latch output buffer circuit 103. The respective bits thus rotated will be sent out to the data bus 101 under the control of the output control signal 106.

The above conventional barrel shifter circuit having a rotating function has the following defects. Since it uses a unidirectional n-bit barrel shifter 102, it requires the number n×n of transfer gates (marked with ○ in FIG. 2) corresponding to n bits×n bits, and so requires a relatively large area. Also, each of the output lines corresponding to the respective bits, which is connected through the n number of the transfer gates corresponding to the n bits, provides a relatively large load capacitance. This means that the above conventional barrel shifter circuit is unsuited to a high speed operation.

SUMMARY OF THE INVENTION

It is, therefore, an object of the invention to overcome the problems existing in the conventional barrel shifter circuit and to provide an improved barrel shifter circuit having a rotation function.

It is another object of the present invention to provide a barrel shifter circuit which has a reduced number of transfer gates accommodated within a small area, and which can reduce its load capacitance thereby to realize a high speed operation.

In order to attain the above object, in accordance with one aspect of the present invention, there is provided an n-bit barrel shifter circuit having a rotation function comprising:

a bidirectional barrel shifter having inputs at its two ends; and a rightward shift change device and a leftward shift change device respectively connected with the inputs of the barrel shifter, for controlling rightward and leftward shifting in accordance with the number of bits of data of n bits to be shifted up to (n−1);

the bidirectional barrel shifter receiving a bit control signal for controlling shifting of bits of {(an integer part of n/2)+1} bits.

BRIEF DESCRIPTION OF THE DRAWINGS

The above and other objects, features and advantages of the present invention will be apparent from the following description of preferred embodiments of the invention, with reference to the accompanying drawings, in which.

PREFERRED EMBODIMENTS OF THE INVENTION

Figure 1:
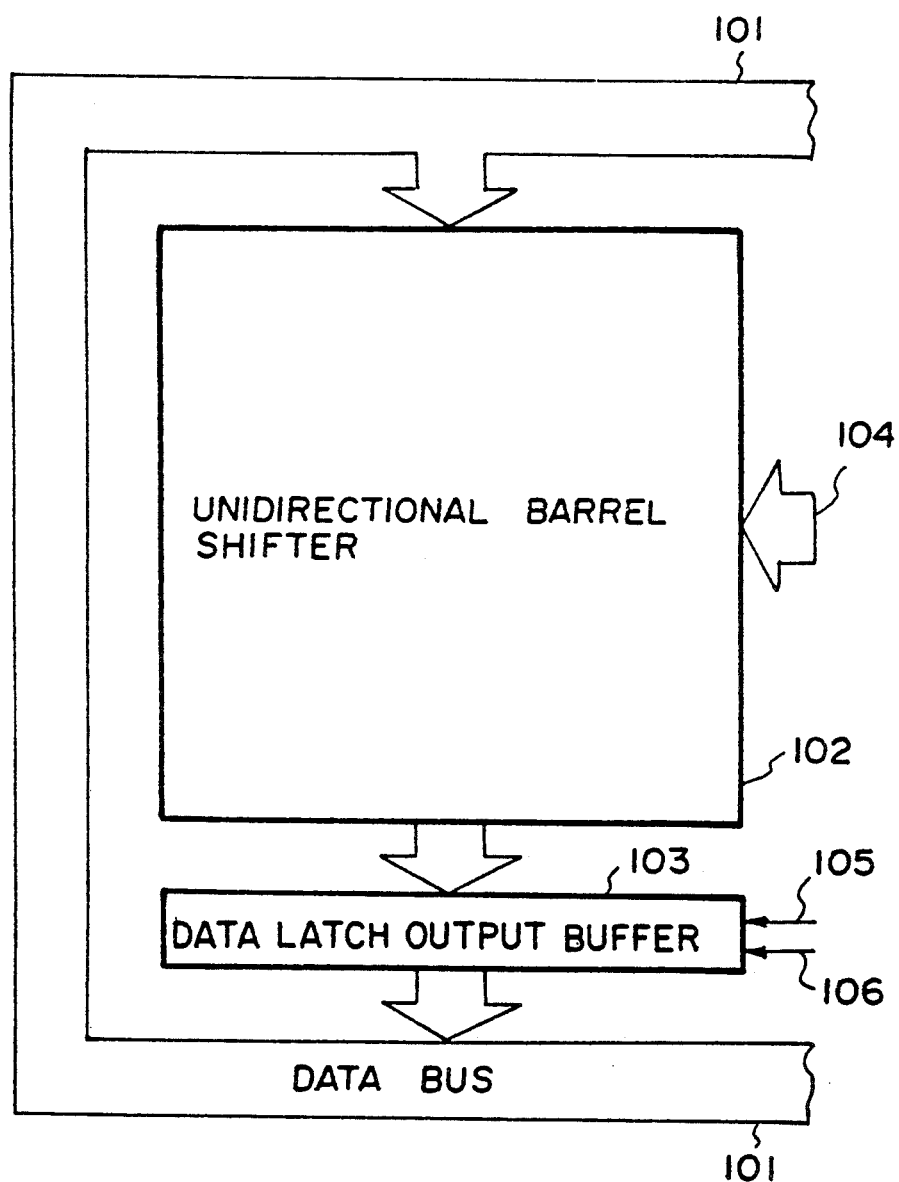
FIG. 1 is a block diagram of the conventional barrel shifter circuit having a rotating function.
Figure 2:
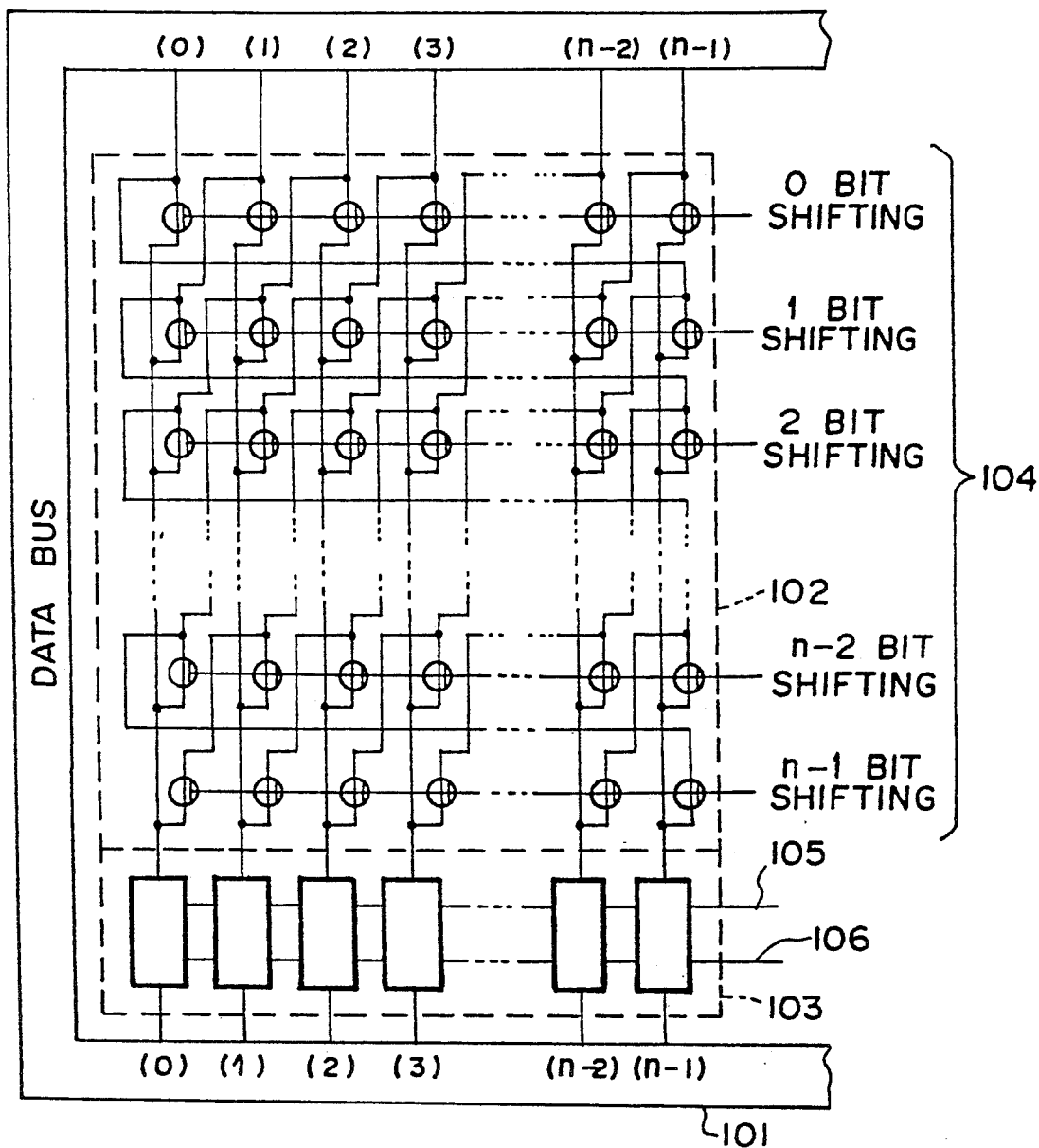
FIG. 2 is a block diagram of a detailed example of the barrel shifter circuit of FIG. 1.

Now, referring to the drawings, embodiments of the present invention will be explained below.

Figure 3:
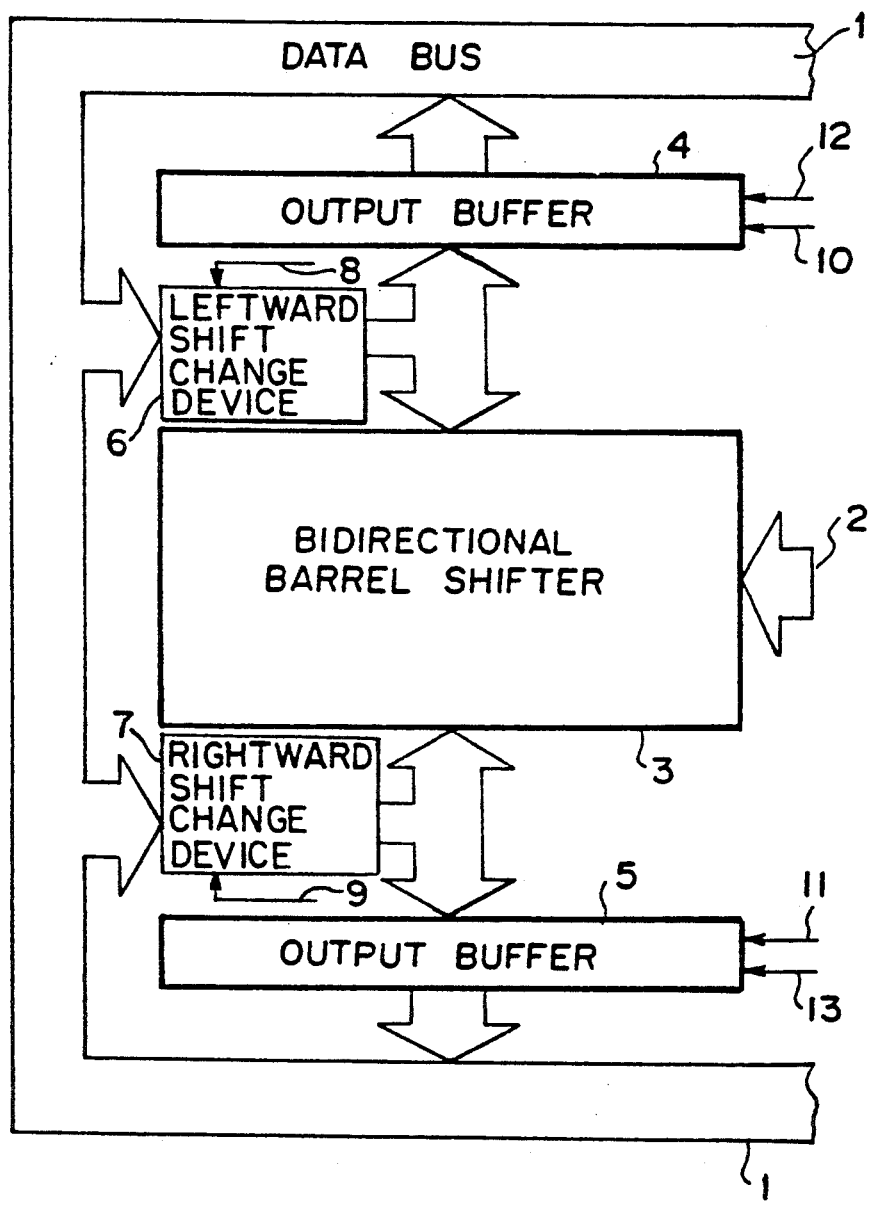
FIG. 3 is a block diagram of the barrel shifter circuit according to one embodiment of the present invention.

FIG. 3 is a circuit diagram of the barrel shifter circuit according to one embodiment of the present invention. In FIG. 3, first, data on a data bus 1, in response to a leftward shift signal 8 or a rightward shift signal 9, is selectively inputted to a bidirectional barrel shifter 3 through a leftward shift change device 6 or a rightward shift change device 7. The outputs from the bidirectional barrel shifter 3 are sent out to the data bus 1 through a leftward shifting data latch output buffer circuit 5 in the case where the leftward shifting has been carried out or a rightward shifting data latch output buffer circuit 4 in the case where the rightward shifting has been carried out.

A rightward shifting data latch control signal 10 and a rightward shifting output control signal 12 are applied to the rightward shifting data latch output buffer circuit 4 whereas a leftward shifting data latch control signal 11 and a leftward shifting output control signal 13 are applied to the leftward shifting data latch output buffer circuit 5. Also, a bit shift control signal group 2 is applied to the bidirectional barrel shifter 3.

Figure 4:
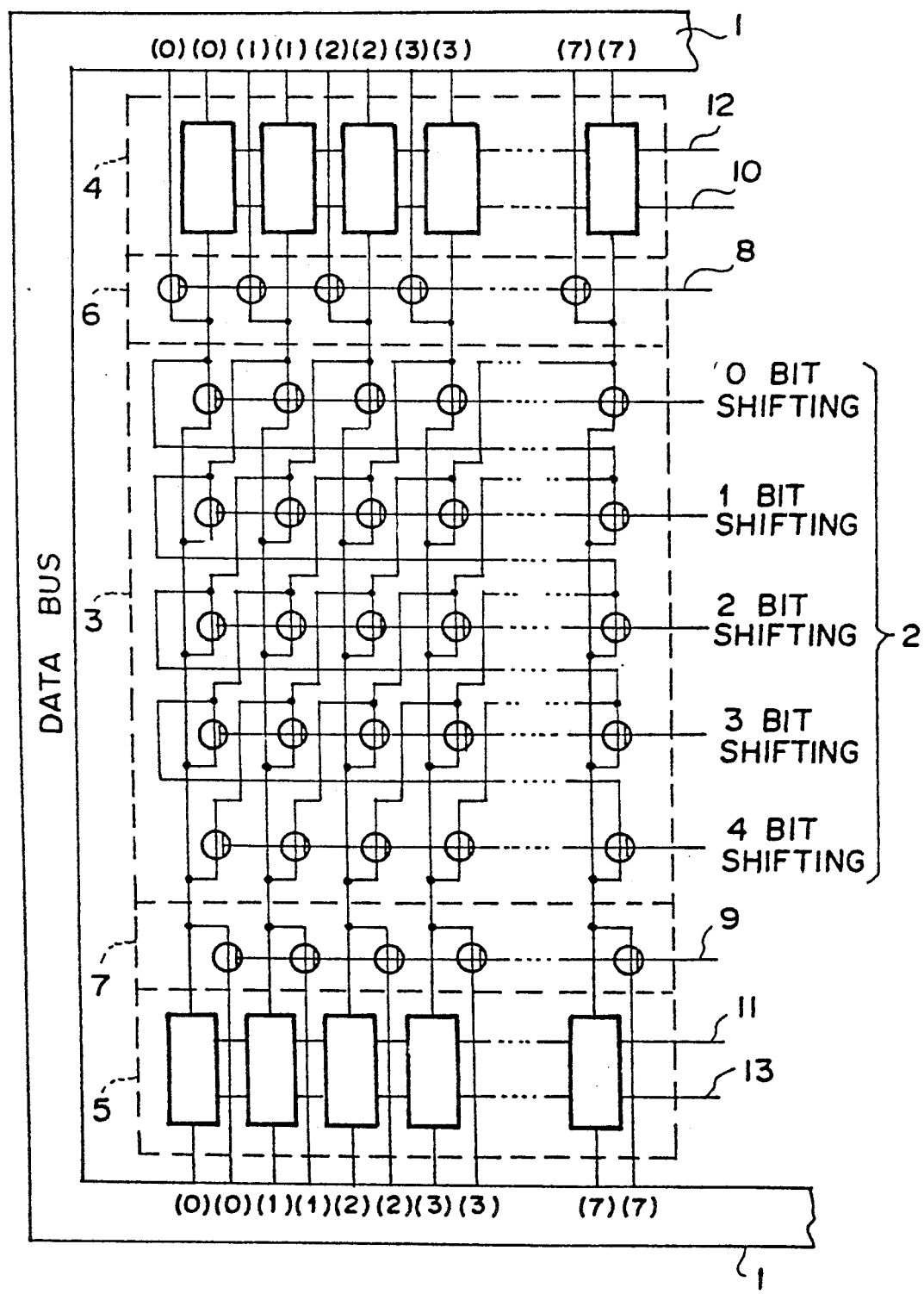
FIG. 4 is a circuit diagram of a detailed example of the barrel shifter circuit of FIG. 3.

A detailed circuit diagram for the barrel shifter circuit for 8 (eight) bits is shown in FIG. 4. In FIG. 4, like reference numerals refer to like parts in FIG. 3. It should be noted that in the case of the rotation of 0~4 bits, the leftward shift signal 8 is set for "H" while the rightward shift signal 9 is set for "L", and in the case of the rotation of 5~7 bits, the leftward shift signal 8 is set for "L" while the rightward shift signal 9 is set for "H".

The rotation of 3 bits will be carried out as follows. In this case, the leftward shift signal 8 is "H". Therefore, the respective data bits (0)~(7) on the data bus 1 (expressed as data bus 1 (0)~(7) for convenience for explanation) are inputted to the leftward shift change device 6. The outputs therefrom are inputted to the bidirectional barrel shifter 3. Now, a 3-bit shifting control signal is selected in the bit shift control signal group 2 to rotate the data to left by 3 bits. The output lines of the respective data bits are inputted to the leftward shifting data latch output buffer circuit 5. Thereafter, in response to the leftward shifting output control signal 13, the data thus rotated are sent out to the data bus (0)~(7). Thus, the data bits on the data bus 1 (0)~(7) before the rotation are located at the data bus 1 (5)~(7) and (0)~(4) after the rotation, respectively.

Next, the rotation of 6 bits will be carried out as follows. In this case, the rightward shift signal 9 is "H". Therefore, the respective data bits (0)~(7) on the data bus 1, i.e., the data bus (0)~(7) are inputted to the rightward shift change device 7. The outputs therefrom are inputted to the bidirectional barrel shifter 3. Now, since the rotation of 6 bits to left is equivalent to that of 2 bits to right, a 2-bit shift control signal is selected in the bit shift control signal group 2 to rotate the data to right 2 bits. The output lines of the respective data bits are inputted to the rightward shifting data latch output buffer circuit 4. Thereafter, in response to the rightward shifting output control signal 12, the data are sent out to the data bus (0)~(7). Thus, the data bits on the data bus (0)~(7) before the rotation are located at the data bus (2)~(7) and (0)~(1) after the rotation, respectively.

As understood from the above description, in the example of the barrel shifter circuit for 8 bits, the prior art circuit requires 64 (=8×8) transistors whereas the above embodiment according to the present invention requires only 56 {=8 (bits)×(5 (bit shift control signal group)+2 (rightward and leftward shifting signals))} including the barrel shifter 3 and the change devices 6, 7. Thus, the number of elements required can be reduced so that the area occupied by them is reduced. Additionally, the load capacitance attendant to each of the output lines of the barrel shifter can be reduced.

In the case where a large number of bits are to be shifted, the barrel shifter circuit according to the present invention can have a greater advantage in a two-step shifting system consisting of bit-shifting and byte-shifting.

Figure 5:
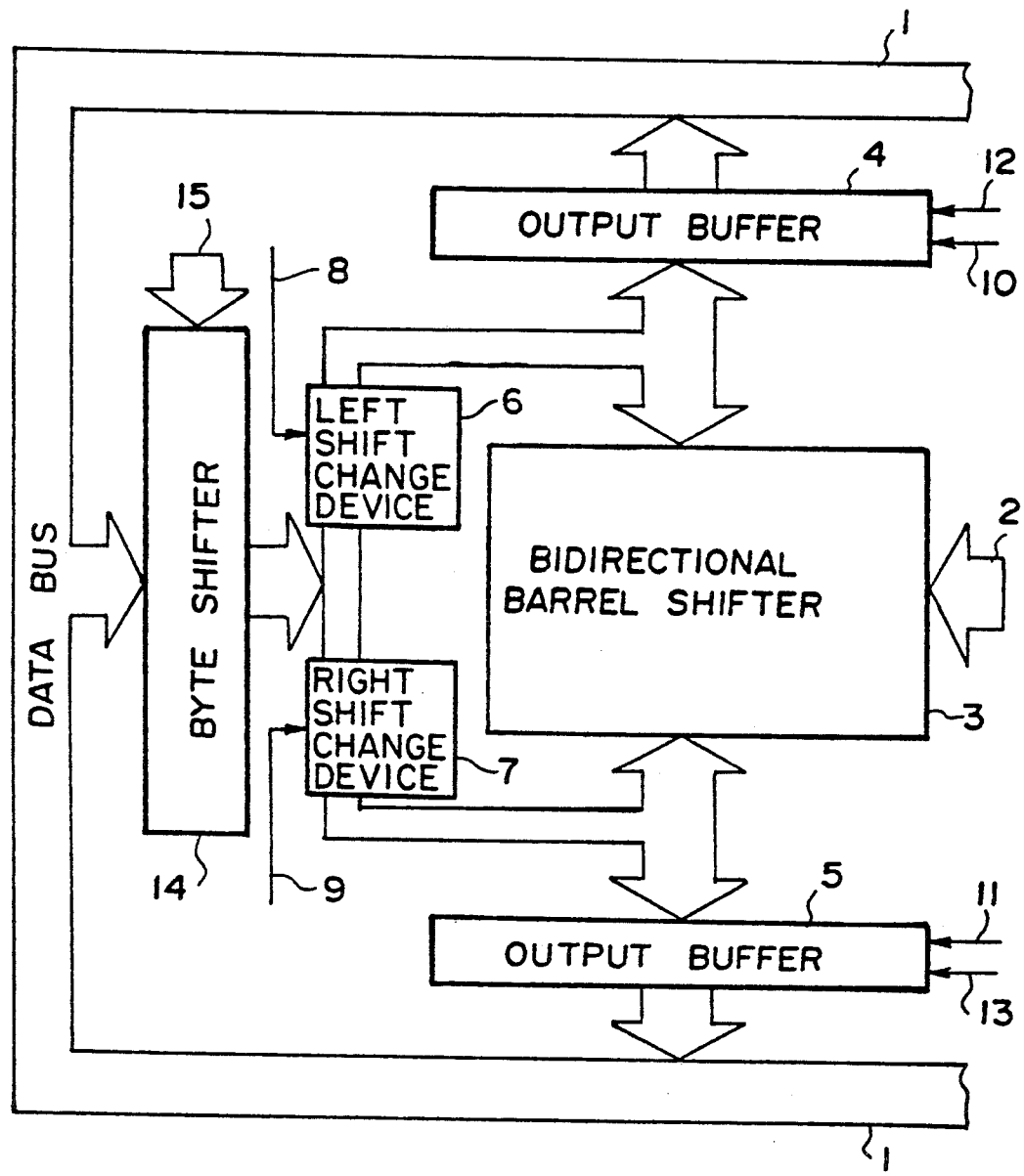
FIG. 5 is a block diagram of the barrel shifter circuit according to another embodiment of the present invention in which a two-step shift system of bit-shift and byte-shift is adopted.
Figure 6A:
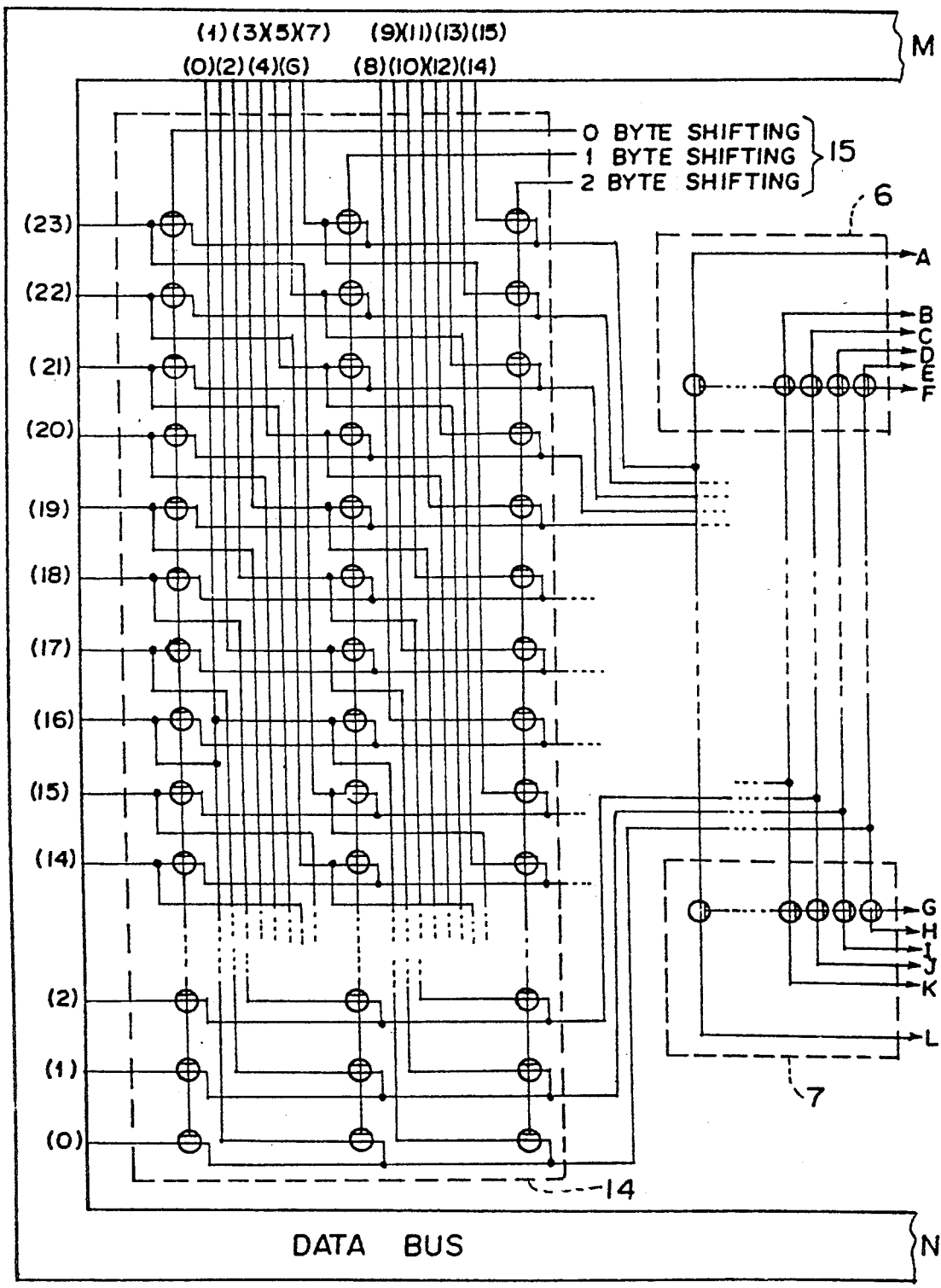
FIGS. 6A and 6B are circuit diagrams of detailed examples of the barrel shifter circuit of FIG. 5.
Figure 6B:
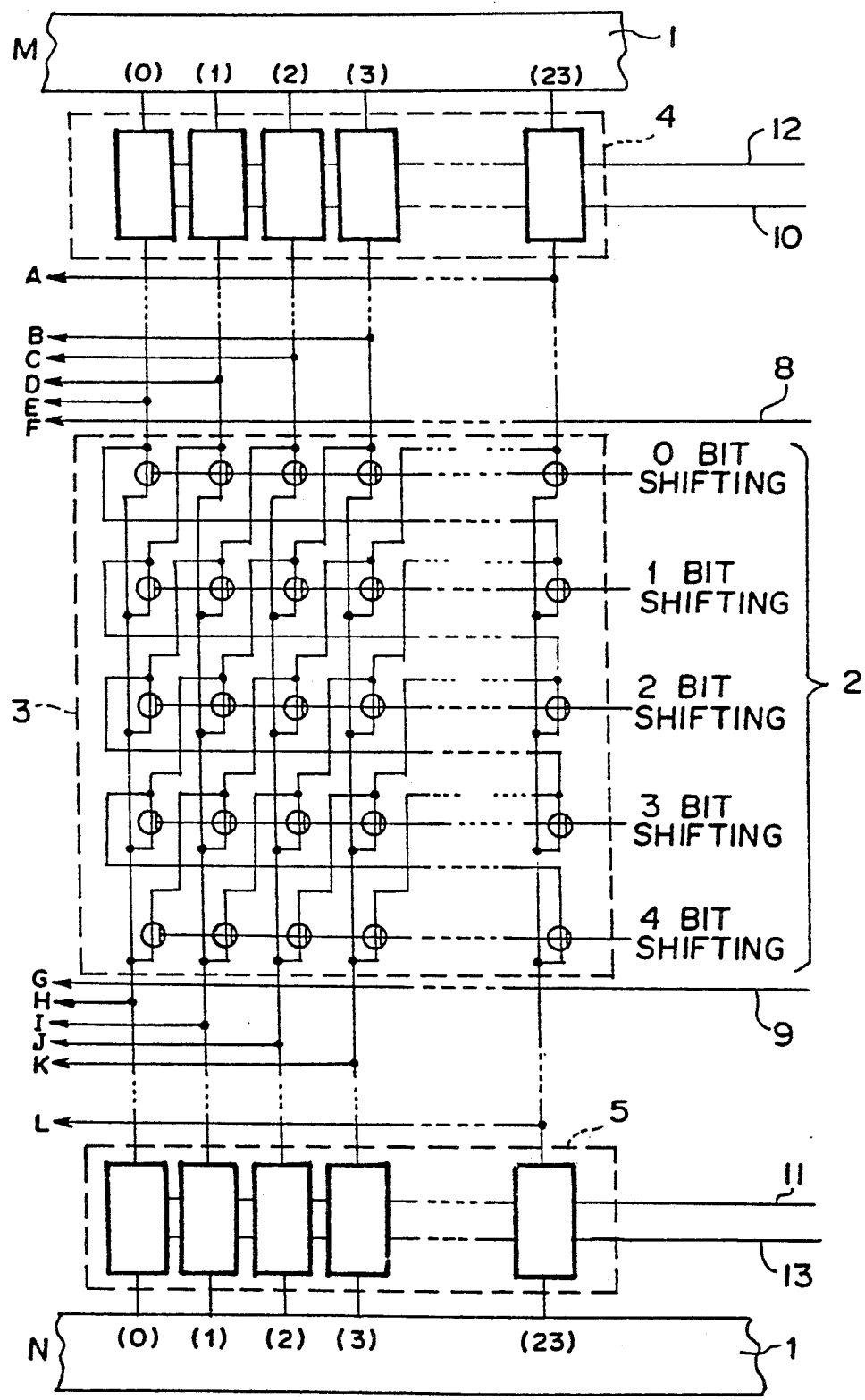

Now, referring to FIGS. 5, 6A and 6B, an explanation will be given of another embodiment of the present invention adopting such two-step shifting system. In FIGS. 5, 6A and 6B, like reference numerals refer to like parts in FIGS. 3 and 4.

FIG. 5 shows an arrangement of this embodiment designed in a two-step shifting system. Whereas in the embodiment of FIG. 3, the data bus 1 is directly connected with the leftward shifting change device 6 and the rightward shifting change device 7, in this embodiment, the data bus 1 is first connected with a byte shifter 14 and the output from the byte shifter 14 is connected with the leftward shifting change device 6 and the rightward shifting change device 7.

A detailed circuit diagram of the barrel shifter for 24 bits as shown in FIG. 5 is shown in FIGS. 6A and 6B. The entire circuit can be completed by uniting FIGS. 6A and 6B in such a manner that wirings A to L and symbols M and N indicative of the data bus 1 in FIG. 6A are connected with the same symbols in FIG. 6B, respectively.

Now, it should be noted that in case of the rotation of (0)~(3), (8)~(11) and (16)~(19) bits, the leftward shift signal 8 is set for "H" while the rightward shift signal 9 is set for "L", and in case of the rotation of (4)~(7), (12)~(15) and (20)~(23) bits, the leftward shift signal 8 is set for "L" while the rightward shift signal 9 is set for "H".

The rotation of 10 bits will be carried out as follows. First, the respective data bits (0)~(23) on the data bus (expressed as data bus (0)~(23) for convenience for explanation) are inputted to the byte shifter 14. A 1 (one) byte shift control signal is selected in a byte shift control signal group 15 to rotate the data to left by 8 bits. Since the leftward shift signal 8 is now "H", the 8-bit leftward rotated output from the byte shifter 14 is inputted to the bidirectional barrel shifter 3 through the leftward shift change device 6. Then, a 2-bit shift control signal is selected in the bit shift control signal group 2 to further rotate the data to left by 2 bits. The output lines of the respective data bits are inputted to the leftward shifting data latch output buffer circuit 5. Thereafter, in response to the leftward shifting output control signal 13, the data are sent out to the data bus (0)~(23). Thus, the data bits on the data bus (0)~(23) before the rotation are located at the data bus (14)~(23) and (0)~(13) after the rotation, respectively.

As understood from the above description, in connection with the barrel shifter circuit for 24 bits, the prior art circuit requires 576 (24×24) transistors whereas the above embodiment of the present invention requires only 240 transistors {=120 (24×5) for the bidirectional barrel shifter +72 (24×3) for the byte shifter +48 (24×2) for the leftward and rightward shifting change devices}. Thus, the number of elements required can be reduced greatly so that the area occupied by them is considerably reduced. Additionally, the load capacitance attendant to each of the output lines of the barrel shifter can be reduced.

As described above, in the n-bit barrel shifter circuit having a rotation function according to the present invention, the inputs of a bidirectional barrel shifter are connected with a rightward shifting change device and a leftward shifting change device for controlling rightward and leftward shifting in accordance with the number of bits to be shifted up to (n−1), respectively, and a bit shift control signal capable of controlling shifting of bits of {(an integer part of n/2)+1} bits is inputted to the bidirectional barrel shifter. Therefore, in accordance with the present invention, the number of elements in a barrel shifter circuit can be greatly reduced as compared with the prior art curcuit so that the area occupied by them is reduced. Further, the load capacitance attendant to each of the output lines of the barrel shifter can be greatly reduced.

While the invention has been described in its preferred embodiments, it is to be understood that the words which have been used are words of description rather than limitation and that changes within the purview of the appended claims may be made without departing from the true scope and spirit of the invention in its broader aspects.

What is claimed is:

1. An n-bit barrel shifter circuit having a rotation function and connected with a data bus, said circuit comprising:

first and second buffer circuits each being connected to said data bus, each of said first and second buffer circuits selectively operating such that one of said buffer circuits operates as an output buffer while another of said buffer circuits operate as an output buffer depending on the number of bits to be shifted in data of n bits;

a bidirectional barrel shifter formed by {n×(integer part of n/2+1)} number of transistors and having two inputs coupled to said data bus through said first and second buffer circuits, respectively; and a rightward shift change device and a leftward shift change device respectively connected with said two inputs of said barrel shifter, for controlling one of rightward and leftward shifting depending on the number of bits to be shifted in the data of n bits, said bidirectional barrel shifter receiving a bit control signal group which includes {(an integer part of $n/2$)+1} number of signals for controlling bit shifting up to $(n-1)$ as the maximum number.

2. An n-bit barrel shifter circuit having a rotation function according to claim 1, and further comprising a byte shifter having inputs which are connected to said data bus and outputs which are connected to said rightward and leftward shift change devices, for shifting respective bits of data sent from said data bus to the right or the left with a byte as a unit.

* * * * *